United States Patent [19]
Duncan

[11] Patent Number: 5,193,909
[45] Date of Patent: Mar. 16, 1993

[54] QUANTITATIVE METHOD FOR MEASURING HEAT FLUX EMITTED FROM A CRYOGENIC OBJECT

[75] Inventor: Robert V. Duncan, Tijeras, N. Mex.

[73] Assignee: The United States of America as represented by the United States Department of Energy, Washington, D.C.

[21] Appl. No.: 881,980

[22] Filed: May 12, 1992

[51] Int. Cl.$^5$ .......................................... G01K 17/00
[52] U.S. Cl. ..................................... 374/29; 374/176
[58] Field of Search ...................... 374/29, 30, 31, 43, 374/44, 176; 250/338.1

[56] References Cited

U.S. PATENT DOCUMENTS

| | | | |
|---|---|---|---|
| 3,575,053 | 4/1971 | Telinde . | |
| 3,646,813 | 3/1972 | Kuzniete et al. | 374/176 |
| 3,665,761 | 5/1972 | Gregory | 374/31 |
| 3,745,460 | 7/1973 | Belzer et al. | 324/158 |
| 3,906,231 | 9/1975 | Fletcher et al. | 250/338 |
| 4,123,938 | 11/1978 | Hamilton . | |
| 4,302,943 | 12/1981 | Niemann et al. | 374/176 |
| 4,464,065 | 8/1984 | Wolf et al. | 374/121 |
| 4,840,495 | 6/1989 | Bonnefoy | 374/43 |

FOREIGN PATENT DOCUMENTS 3-185882  8/1991  Japan ................................. 374/176

OTHER PUBLICATIONS

R. Duncan, "Thermal Effects on the Josephson Series-Array Voltage Standard", Physica B, vol. 165, pp. 101–102, 1990.

J. Adler et al., "Instabilities in Superconducting Tunnel Junctions in Different Thermal Environments", *Appl. Phys. Lett.*, 42(10), May 15, 1983, pp. 904–905.

G. Ahlers et al., "Recent Experiments Near the Superfluid Transition in $^4$He", Frontiers of Physics, Jun. 1988, pp. 219–238.

W. Dietsche, "Imaging of the Phonon Emission in the Quantum–Hall Effect", *XIX International Conference on Low Temperature Physics* Conference Handbook, Aug. 1990, p. 249.

R. Fagaly, "SQUID Instrumentation and Applications", *Superconductor Industry*, Winter 1989, pp. 24–30.

*Primary Examiner*—William A. Cuchlinski, Jr.
*Assistant Examiner*—G. Bradley Bennett
*Attorney, Agent, or Firm*—Karla Ojanen; James H. Chafin; William R. Moser

[57] ABSTRACT

The present invention is a quantitative method for measuring the total heat flux, and of deriving the total power dissipation, of a heat-fluxing object which includes the steps of placing an electrical noise-emitting heat-fluxing object in a liquid helium bath and measuring the superfluid transition temperature of the bath. The temperature of the liquid helium bath is thereafter reduced until some measurable parameter, such as the electrical noise, exhibited by the heat-fluxing object or a temperature-dependent resistive thin film in intimate contact with the heat-fluxing object, becomes greatly reduced. The temperature of the liquid helium bath is measured at this point. The difference between the superfluid transition temperature of the liquid helium bath surrounding the heat-fluxing object, and the temperature of the liquid helium bath when the electrical noise emitted by the heat-fluxing object becomes greatly reduced, is determined. The total heat flux from the heat-fluxing object is determined as a function of this difference between these temperatures. In certain applications, the technique can be used to optimize thermal design parameters of cryogenic electronics, for example, Josephson junction and infra-red sensing devices.

20 Claims, 2 Drawing Sheets

QUANTITATIVE METHOD FOR MEASURING HEAT FLUX EMITTED FROM A CRYOGENIC OBJECT

RIGHTS OF THE GOVERNMENT

The United States Government has rights in this invention pursuant to Contract No. DE-AC04-76DP00789 between the U.S. Department of Energy and American Telephone and Telegraph Company.

BACKGROUND OF THE INVENTION

The present invention relates generally to heat flux measurements and, more particularly, to a method for measuring the heat flux and total power dissipation per unit area of an object cooled in a liquid helium bath.

Cryogenics is the science pertaining to the production and effects of very low temperatures and employs various refrigeration techniques. With a suitable refrigeration process and the Dewar method of vacuum insulation, adequate quantities of liquid helium in a static condition can be utilized for cooling electronic devices during operation, such as Josephson junction arrays. However, because the Dewar-type insulation chamber is sealed to the atmosphere and obviously operates at extremely low temperatures, it is difficult to determine the power dissipated per unit area by an object while the device is in operation within the chamber. The ultimate performance of many cryoelectronic devices, such as semi- or super-conducting junction arrays, critically depends on minimizing the total power dissipation of the device.

In another cryogenic application, an accurate determination of the total power dissipated from a radioisotope, for example, tritium, provides an accurate assay of the total radioactivity of the material contained within the vessel. Techniques such as argon vapor boil-off rate measurements from a liquid argon bath which surrounds the vessel are elaborate and costly. Although the spatial distribution of power dissipated per unit area by the heat-emitting object may be determined optically, this method requires optical access to the interior of the Dewar-type insulation chamber. This optical technique, moreover, provides only the spatial distribution of the areal power dissipation and the calibration of this optical information to actual quantitative measures of the power dissipation per unit area is difficult. Obviously, providing optical access and the associated hardware required to optically determine the amount of power dissipated per unit area by the heat-fluxing object greatly increases the cost and complexity of the insulation chamber.

Consequently, a need exists for a simplified and improved method for measuring the total heat flux Q of a heat-fluxing object operating within an appropriate insulation chamber such as a Dewar-type insulation chamber.

These and other advantages and attainments of the present invention will become apparent to those skilled in the art upon a reading of the following detailed description when taken in conjunction with the drawing wherein there is shown and described an illustrative embodiment of the invention.

SUMMARY OF THE INVENTION

The present invention is a method for measuring the total heat flux, Q, of an object operating within an insulating chamber such as a Dewar-type insulating chamber designed to satisfy the aforementioned need. The method is implemented by measuring the difference between the superfluid transition temperature of the liquid helium bath well away from the device within the insulation chamber and the temperature of the liquid bath at which electrical noise emitted by the heat-fluxing object, as it operates, becomes greatly reduced. This reduction in the electrical noise is indicative of the enhanced cooling of the device by the superfluid helium. This measured temperature difference is used to determine the total heat flux by the heat-fluxing object.

In accordance with the present invention, there is provided a quantitative method for measuring heat flux, comprising: placing an object whose heat flux is to be measured in a liquid helium bath; and, if necessary, placing a temperature-dependent resistive film in intimate contact with the heat-fluxing object; measuring the superfluid transition temperature of the bulk liquid helium bath; reducing the temperature of the bulk liquid helium bath until the superfluid helium comes in contact with and cools the surface of the object whose heat flux is to be measured, or if there is placed a film upon the object, cools the surface of the film: instantaneously measuring the temperature of the bulk liquid helium bath when the superfluid helium reaches the surface of the object whose heat flux is to be measured, or the surface of the film, the determination of which can be detected by a sudden change in an electrical property of the object or film, or a quietude of a measurable property of the object or the film; determining the difference between the superfluid transition temperature of the bulk liquid helium bath as above prior to temperature reduction and the temperature of the bulk liquid helium bath as above when the superfluid helium first cools the surface of the heat fluxing object or the film; determining the total heat flux emitted by the heat-fluxing object as a function of the difference to thereby obtain a measurement of the total heat flux emitted by the object.

BRIEF DESCRIPTION OF THE DRAWINGS

In the course of the following detailed description, reference will be made to the following figures.

DETAILED DESCRIPTION OF THE INVENTION

Figure 1:
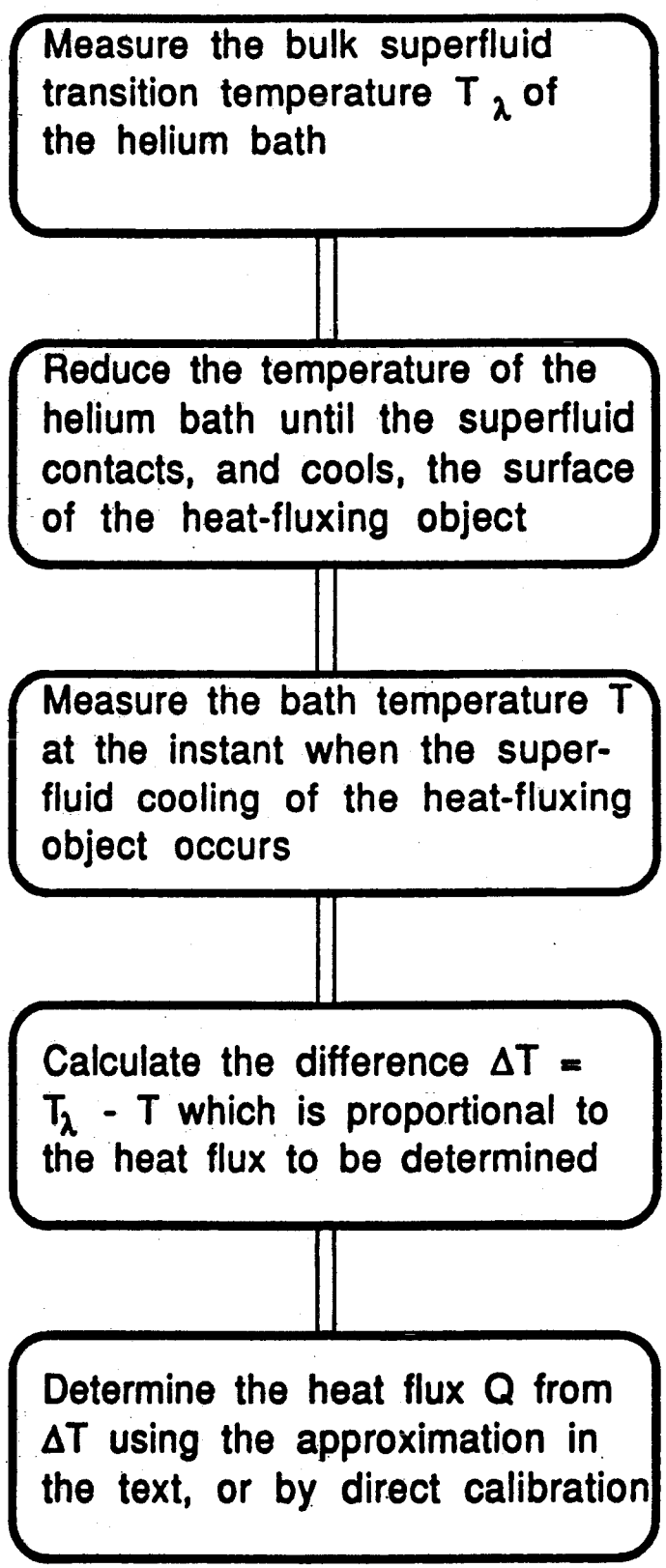
FIG. 1 which illustrates the method of the present invention for measuring the total power dissipation per unit area of a heat-fluxing object in flow chart form.

The present invention is a quantitative method for determining the total heat flux, Q, emitted from, or power dissipated per unit area by, heat-fluxing objects, such as cryoelectronic devices or contained radioisotopes. Most heat-fluxing objects that are cooled by liquid $^4$He demonstrate a dramatic reduction and a sudden quietude in their electronic noise levels and/or other performance characteristics when the helium in contact with the object transitions into its superfluid state. This effective superfluid transition temperature at the surface of the heat-emitting object is lower than the bulk superfluid transition temperature of the surrounding bath by an amount which is approximately proportional to the heat flux emitted from the surface of the device. As will be described herein, by carefully measuring the difference between the superfluid transition temperature of the bulk liquid $^4$He bath and the temperature at which the helium becomes a superfluid at the surface of the heat-fluxing object, which can be determined when the object becomes suddenly quiet, the total heat flux being emitted by the device may be determined. The total heat flux from the object may be derived from a combination of sources. These sources of heat include electrical dissipation from the device itself, waveguides, wires, mechanical supports leading to the device, radioisotope decay within the object, or absorbed black-body radiation from nearby objects at higher temperatures. Only the first of these sources, namely electrical power dissipation, can be readily measured using conventional methods when the device is located in a helium bath. The quantitative method of the present invention, however, allows the total heat flux from all sources to be determined. Clearly this new method provides a useful and powerful diagnostic which may be used to optimize the design and improve the performance of all devices cooled by liquid $^4$He, and devices operated at somewhat higher temperatures which may be characterized in this manner under liquid $^4$He.

The use of liquid $^4$He is preferred because it undergoes a superfluid transition at 2.1768K under its saturated vapor pressure of 38 torr. Between its liquid-vapor critical point of 5.2K and 0.22 MPa and 2.1768K at SVP liquid $^4$He is known as helium I and behaves as other liquids. However, with further cooling to below 2.1768K liquid $^4$He is known as helium II and becomes a "superfluid" with zero viscosity. Superfluid helium will flow through the most minute pores that are impervious to any other known liquid. Moreover, above the superfluid transition temperature, helium is a good thermal insulator, but immediately below that temperature, the thermal conductivity of superfluid helium approaches infinity.

In liquid $^4$He near its superfluid transition temperature the effective thermal resistance of boundaries between solids and superfluid helium, referred to as the Kapitza resistance, is dependent upon the heat flux Q emitted from the surface of the solid and the temperature difference between the actual temperature of the helium and its superfluid transition temperature. The zero-Q limit of this anomalous Kapitza resistance results from the formation of a helium boundary layer, and the theoretical calculation of this anomalous Kapitza resistance utilizing the dynamic renormalization group theory of the superfluid transition applied to heat transport near boundaries agrees well with experimental data. All these models of the anomalous Kapitza resistance are based on the existence of this boundary layer of normal liquid $^4$He between the surface of the heat-fluxing object and the superfluid helium bath. Within this boundary layer the liquid $^4$He cannot exhibit its superfluid property of perfect heat conduction; but rather supports a thermal gradient because of the proximity of the surface of the heat-fluxing object. Measurements of the effect of such a boundary layer in normal-fluid helium very near the superfluid transition suggest that this layer may have an effective average thermal conductivity as small as its thermal conductivity well above temperature of the superfluid transition, which is roughly four orders of magnitude smaller than that of OFHC (oxygen free high conductivity) copper near 2K, and infinitely smaller than the perfect conductivity of the helium bath in the superfluid phase. The thickness of this boundary layer, together with the total temperature gradient across it, becomes insignificantly small as the temperature of the helium bath (which bathes the heat emitting surface of the heat-fluxing object) is lowered sufficiently far below the helium bath superfluid temperature.

Different methods may be used to measure the rapid cooling of the object or of the film on the surface of the object when the Q-dependent boundary layer collapses. These include resistive thermometry, magnetic thermometry, and noise thermometry. The last of these, namely noise thermometry, is often the most convenient. The electrical noise created by the random fluctuation of electrons in the conductor is a universal property of all conductors. This Johnson noise has an amplitude proportional to the square root of the absolute temperature. Hence a sudden change of the device's temperature and hence of its surface temperature will create a sudden change in the amplitude of the random voltage noise observed across the conducting device. Often other forms of electrical noise of higher amplitude than Johnson noise will also exist. Most of these noise sources become smaller as the absolute temperature decreases. Hence it is possible to detect a sudden change in the device's temperature by noticing a sudden change in the noise voltage amplitude. For this application it is only necessary to know when the surface of the device cools suddenly. The actual amount by which the surface cools when the Q-dependent boundary layer collapses is not important. Therefore, there is no need to calibrate the noise or any other form of thermometry described above. It is only necessary to measure the bulk superfluid $^4$He temperature accurately at the precise moment when the object's surface cools suddenly.

As previously stated, the dependence of the anomalous Kapitza resistance on the heat flux Q results from the boundary layer effect between the liquid $^4$He in contact with the heat-fluxing object and the surface of the heat-fluxing object itself; and is independent of the material from which the solid surface of the heat-fluxing object was prepared. The amount $\Delta T$ below the superfluid transition temperature $T_\lambda$ of the liquid $^4$He bath which a device must be cooled to reduce the Q-dependent boundary effects to an insignificant level may be denoted by the dimensionless value $t_c = \Delta T/T_\lambda$. This value of $t_c$ approximately equals $5.5 \times 10^{-6}$ Q, for Q between 0.45 and 50 microwatts per square centimeter. Assuming that the helium bath experiences only its saturated vapor pressure and provided that $t_c$ is greater than or equal to $10^{-3}$, the zero-Q limit of this anomalous Kapitza resistance will be of no consequence. For the condition when T is less than $T_\lambda - \Delta T$, the heat emitting surface of the heat-fluxing object will experience virtually perfect cooling from the superfluid helium bath and the heat-fluxing object will be isothermal. A small temperature jump will still exist right at the surface of the heat-fluxing object; however, the superfluid properties of the liquid $^4$He will extend right up to the device surface creating the best possible cooling of the device. This abrupt isothermal device cooling which occurs when $T < T_\lambda - \Delta T$ creates the dramatic change in the device's performance indicative of the superfluid transition at the surface of the device emitting the heat. The difference $\Delta T$ between the temperature when the bath goes superfluid and when the device electrical noise and/or other measurable properties abruptly change is proportional to the total heat flux Q emitted by the device. These measurements of Q may be used to evaluate various designs including, but not limited to, microlithographic heat sinking which dramatically improve the performance of cryogenic devices.

As discussed above, the source of heat may be created by the object itself or it may be emitted from some material within the object. To detect the superfluid transition at the surface of the object, some property of the object may change abruptly, or a thin conductive film with strongly temperature-sensitive properties may be placed in intimate contact with the object. If a film is used, the film must have some temperature-dependent property, such as a temperature-dependent resistivity. Alternatively, the film may exhibit a temperature-dependent magnetization allowing the sudden change in the film magnetization to be indicative of the superfluid transition at the surface. Magnetic properties can be used in conjunction with the film if, for instance, although the film may not be inherently magnetic, some powder of magnetic material may be pressed or vacuum deposited onto the film.

There are a variety of methods used to detect when the bulk liquid $^4$He becomes a superfluid. One such technique involves measuring the phenomena of second sound. Second sound is a temperature entropy wave which propagates only in superfluid phase of liquid $^4$He. Its detection requires a heater which is pulsed with abrupt electrical pulses to create heat. The heater is placed a given distance from a thermometer, and both the heater and the thermometer are immersed in the liquid $^4$He well away from device. In normal fluid helium, the time for the heat to diffuse and be detected by the thermometer is so long that the thermometer detects only a gradual rise in temperature. In contrast, when the helium becomes a superfluid (with perfect heat conduction), the thermometer is able to detect the coherent heat pulse. Hence the sudden change in the response of the thermometer to the pulsed heater indicates the bulk $^4$He superfluid transition.

The sudden change in viscosity of the liquid $^4$He as it transitions into superfluid $^4$He can also be used to detect the transition. A long wire of negligible cross-section supported by electrical contacts is placed within a uniform magnetic field. An alternating current is applied through the wire and the wire oscillates at the frequency of the applied alternating current in the magnetic field. The amplitude of oscillation increases greatly when the helium passes through into superfluid phase because of the rapid decrease in the effective viscosity of the bulk helium. Thus the amplitude abruptly increases, indicative of the bulk superfluid transition.

An anomaly in bulk thermal conductivity at the superfluid transition of liquid $^4$He can be used to detect the transition. A thin layer of bulk helium is placed between two horizontal parallel plates bounded on the sides by a thin stainless steel wall, wherein the bottom plate is thermally isolated from top plate by vacuum. The bottom plate is heated slightly. When the helium enters into its superfluid phase, the bottom plate is rapidly cooled through the superfluid properties. The superfluid transition is then detected by the sudden and rapid increase in the bottom plate temperature.

The power limits of the method described herein are determined by the heat output of the object. If the power or heat output is too high, the perfect superfluid state of the liquid $^4$He will be destroyed because of mutual friction within the helium superfluid. Typical power range is from 0.45 microwatts per square centimeter to 50 microwatts per square centimeter. The method may be impractical above 500 milliwatts per square centimeter, because the heating will destroy the superfluid state of the liquid $^4$He.

In order to demonstrate the effectiveness of the method of the present invention, a series-array of 2,076 Josephson junctions located on a thin silicon chip 1.27 cm long and 0.64 cm wide were cooled within a Dewar-type insulating chamber. This Josephson array contained an antenna which interfaced to a WR-12 (E-band) waveguide used to deliver the necessary millimeter wave power when the array was used as a Josephson voltage standard. The millimeter wave power was off and the waveguide served only to provide about thirty microwatts of radiation heating to the array from the room temperature environment. All other sources of heat to the array chip were reduced to much smaller levels. All the Josephson junctions in the array remain superconducting for sufficiently small electrical currents. When this current exceeds the critical current of the weakest junction in the array, a voltage equal to the superconducting gap energy of that junction appears abruptly across the junction. At this point all the other junctions are still superconducting, and hence this voltage across the weakest junction is also the total voltage across the array. Two measurements of this critical current were made. A variable-amplitude, sinusoidal current through the array may be superimposed on the steady array bias current. First, the maximum peak-to-peak current ramp amplitude at fifty hertz which could be sustained for more than one minute without causing the weakest junction to go resistive was recorded and designated $I_1$. Then this current ramp was increased to the point where the weakest three junctions in the array had a high probability of going resistive through the ramp. This current level, which was designated $I_2$, was the maximum coherent array current in the absence of noise. This value of $I_2$ did not change as the drive level was further increased; however, more junctions within the array switched to their resistive state. In the absence of noise, $I_2$ should equal $I_1$. Measurements of the ratio $I_2/I_1$ remained near 0.85 as the array temperature varied from 4.6 K to 2.2 K. The bulk superfluid transition of the bath was indicated by the slowing down of the rate of the bath's saturated vapor pressure decrease at a constant and very slow pumping rate. The pressure at which this occurred agreed to better than 0.5% with the known saturated vapor pressure at the superfluid transition. In two different sets of measurements, the ratio $I_2/I_1$ increased abruptly to 0.95 at a temperature $0.030 +/- 0.005$ K below the bulk superfluid transition temperature. This signalled the onset of superfluid cooling right at the surface of the junction itself. This value of $\Delta T$ indicates that approximately 2.5 milliwatts per square centimeter of heat was fluxing from the surface of this least stable junction, provided that the relation between $t_c$ and Q set forth previously herein is still valid at this much larger value of Q. The relationship between $t_c$ and Q may easily be extended over a wider range of Q by direct calibration.

As described herein, a major benefit of the method of the present invention is that the total power dissipation per unit area from a heat-fluxing object such as a Josephson junction component may be quantitatively determined without using elaborate calorimetric methods, nor requiring optical access to the interior of the Dewar-type insulation chamber, which in turn greatly reduces the cost of the insulation chamber and eliminates the associated optical heat measuring equipment.

Figure 2:
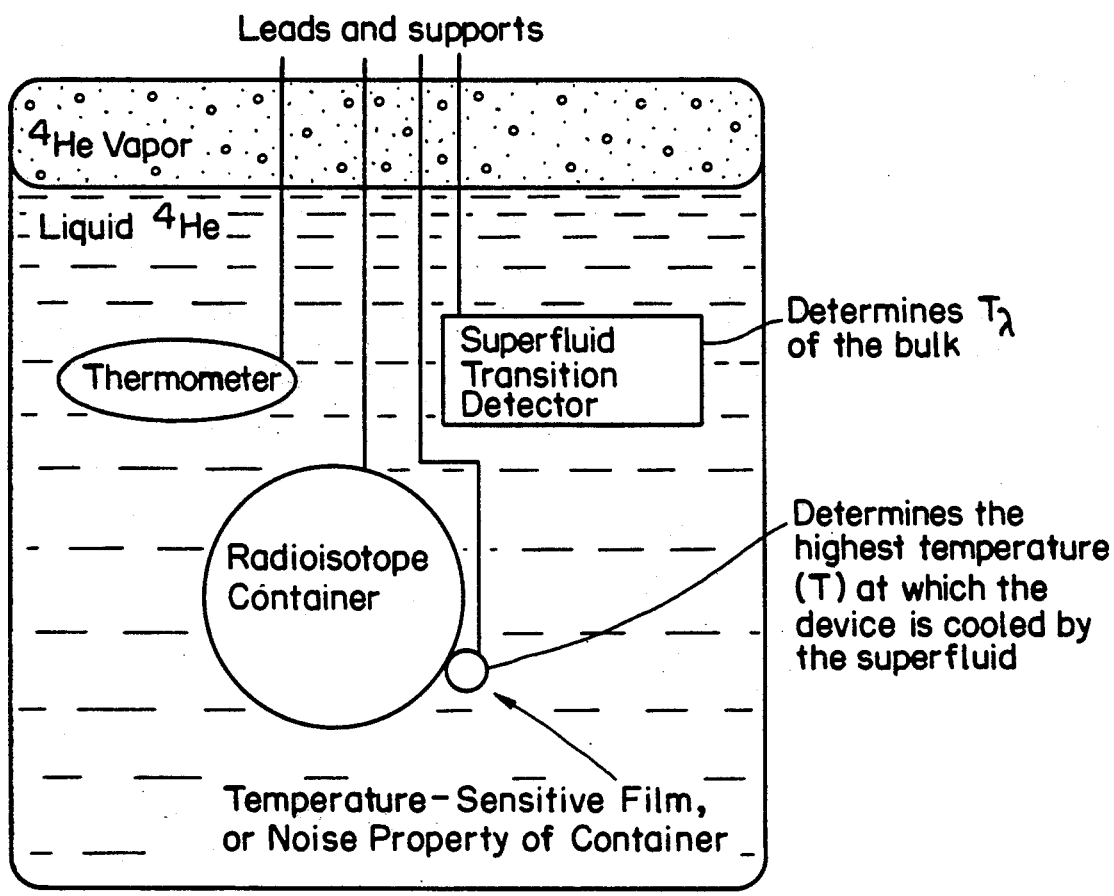
FIG. 2 illustrates how this technique may be used to determine the total level of radioactivity within a vessel immersed in liquid helium.

FIG. 2 illustrates another application of this invention which may be used to determine the total dissipated power within a vessel submersed in liquid $^4$He. The vessel may contain known radioactive isotopes and the vessel may be constructed such that virtually all energy from the radioisotope decay is converted to heat within the vessel. A small strip of temperature sensitive metal deposited on the vessel's exterior surface will serve as the cryoelectronic member which becomes much less noisy as the surface becomes cooled by the superfluid. By design, virtually all the heat flux Q would be created by the radioactive decay of the material within the vessel. If the specific radioisotope in the vessel is known (which is often the case and which may be determined using conventional spectroscopic and other analytical techniques), the total activity level of the vessel's contents may be determined from the value of Q obtained by the inventive method herein. In order to insure that the heat flux Q is in fact uniform over the surface of the vessel, it is necessary to tightly encapsule the radioisotope with the vessel if the radioisotope is a solid or a liquid and that the vessel be of uniform thickness and preparation. Spherical vessels are preferred. With gas-phase radioisotopes at room-temperature it is adequate to introduce the gas into the spherical vessel because at liquid $^4$He temperatures the gas will freeze-out uniformly to the inner surface of the vessel, insuring a uniform heat flux. The total power generated by the radioactive decay within the vessel is then just the heat flux Q multiplied by the exterior surface area of the vessel.

The invention described herein may be used in conjunction with the optical techniques discussed earlier. The optical techniques are used to determine the spatial distribution of power dissipated per unit area by the heat-emitting object. The inventive technique of measuring the differences in temperature of the liquid $^4$He provides an accurate calibration of the optical information to actual quantitative measures of the power dissipation per unit area.

It is thought that the present invention and many of its attendant advantages will be understood from the foregoing description and it will be apparent that various changes may be made in the form, construction and arrangement without departing from the spirit and scope of the invention or sacrificing all of its material advantages, the form hereinbefore described being merely a preferred or exemplary embodiment thereof.

What is claimed is:

1. A method for measuring heat flux, comprising:
   (a) placing an object whose heat flux is to be measured in a liquid helium bath;
   (b) measuring the superfluid transition temperature of the bulk liquid helium bath;
   (c) reducing the temperature of the bulk liquid helium bath until the superfluid helium comes in contact with, and cools the surface of, the object whose heat flux is to be measured;
   (d) instantaneously measuring the temperature of the bulk liquid helium bath when the superfluid helium reaches the surface of the object whose heat flux is to be measured, the determination of which can be detected by a quietude of a measurable property of said object;
   (e) determining the difference between the superfluid transition temperature of the bulk liquid helium bath as in step (b) above prior to temperature reduction and the temperature of the bulk liquid helium bath as in step (d) above when the superfluid helium first cools the surface of the heat fluxing object;
   (f) determining the total heat flux emitted by the heat-fluxing object as a function of the difference determined in step (e) to thereby obtain a measurement of the total heat flux emitted by the object.

2. A method for measuring heat flux, comprising:
   (a) attaching a temperature-sensitive electrically conducting film onto and contiguous with the surface of an object whose heat flux is to be measured;
   (b) placing the object whose heat flux is to be measured in a liquid helium bath;
   (c) measuring the superfluid transition temperature of the bulk liquid helium bath;
   (d) reducing the temperature of the bulk liquid helium bath until the superfluid helium comes in contact with and cools the surface of the object whose heat flux is to be measured;
   (e) instantaneously measuring the temperature of the bulk liquid helium bath when the superfluid helium reaches the surface of the object whose hea flux is to be measured, the determination of which can be detected by a quietude of a measurable property of said film;
   (f) determining the difference between the superfluid transition temperature of the bulk liquid helium bath as in step (c) above prior to temperature reduction and the temperature of the bulk liquid helium bath as in step (e) above when the superfluid helium first cools the surface of the heat fluxing object;
   (g) determining the total heat flux emitted by the heat-fluxing object as a function of the difference determined in step (f) to thereby obtain a measurement of the total heat flux emitted by the object.

3. The method of claim 1, wherein said measurable property of said object is the electrical noise of said object.

4. The method of claim 2, wherein said measurable property of said film is the electrical noise of said film.

5. The method of claim 1, wherein said measurable property of said object is the electrical resistivity of said object.

6. The method of claim 2, wherein said measurable property of said film is the electrical resistivity of said film.

7. The method of claim 1, wherein said measurable property of said object is the magnetization of said object.

8. The method of claim 2, wherein said measurable property of said film is the magnetization of said film.

9. The method of claim 1, wherein said measurable property of said object is the magnetic susceptibility of said object.

10. The method of claim 2, wherein said measurable property of said film is the magnetic susceptibility of said film.

11. The method of claim 1 or 2, wherein step (c) further comprises continuously measuring the temperature of the bulk superfluid helium and measuring the superfluid transition with a detector within the bulk helium and away from said object.

12. The method of claim 11, wherein the step of measuring the superfluid transition comprises measuring the second sound of the superfluid helium.

13. The method of claim 11, wherein the step of measuring the superfluid transition comprises measuring viscosity of the superfluid helium.

14. The method of claim 11, wherein the step of measuring the superfluid transition comprises measuring an anomaly in bulk thermal conductivity of the liquid helium.

15. The method of claim 1 or 2, wherein said heat fluxing object is at least one Josephson junction.

16. The method of claim 1 or 2, wherein said heat fluxing object is at least one Infra red (IR) sensing device.

17. The method of claim 1 or 2, wherein said heat fluxing object comprises a radioisotope of known species.

18. The method of claim 15, further comprising indicating the thermal performance of said Josephson junction.

19. The method of claim 16, further comprising indicating the thermal performance of said Infra-red sensing device.

20. The method of claim 17, further comprising determining the total mass of said radioisotope of known species given the total heat flux of said radioisotope.

* * * * *